Oct. 1, 1968          A. M. MUNCHERYAN          3,404,350
DIRECTED-BEAM PORTABLE LASER SYSTEM
Filed June 2, 1964

INVENTOR.
Arthur M. Muncheryan

United States Patent Office 3,404,350
Patented Oct. 1, 1968

3,404,350
DIRECTED-BEAM PORTABLE LASER SYSTEM
Arthur M. Muncheryan, 1735 Morningside St.,
Orange, Calif. 92667
Filed June 2, 1964, Ser. No. 371,994
7 Claims. (Cl. 331—94.5)

ABSTRACT OF THE DISCLOSURE

A directed-beam portable laser system is described which comprises a pistol-configured housing with an aiming telescope. Internally, the housing comprises two main compartments: a forward compartment having a laser-beam generator and a beam-intensity amplifying means with an outlet section adapted to convert the laser radiation into a parallel beam at the beam emergence port; and, a rear compartment containing a rechargeable direct-current power supply connected, through a controlled vibrator mechanism and a step-up transformer, across the laser-beam generator means for activation thereof. A multiple-switch mechanism imparts safety for triggering the laser-beam generator means. Laser-cooling means and a temperature indicator are also provided in the system.

This invention relates to laser generators and more particularly to a portable laser generator which produces a powerful beam of laser radiation whose intensity remains effective to distances of many miles.

The present portable laser generator is a lightweight, compact, and high-intensity laser-radiation generator which receives its laser-activating energy from a high-intensity electric discharge flashlamp energized by a self-contained electric power supply. The generator can be carried in hand from place to place easily and conveniently and can be used while being carried as well as when stationary, since it has no electric connections or cables to any external power supply source. Because of a provision of a multiple-switch mechanism for triggering laser action, the generator is safe to handle or store away in a carrying case, if necessary, without fear of self-activation to laser action.

For its principal advantage, the laser generator is provided with a solid-state laser emitter which receives a high-intensity radiation in the visible and near-visible spectral range, and converts it to a monochromatic and coherent laser radiation in the wavelength range of 6800 to 9000 angstroms.

An object of the invention, therefore, is to provide a self-contained D-C electric power supply which can be recharged, after exhaustion, by connecting it to a 110-volt A-C power source, such as a household power outlet.

A further object of the invention is to provide a means of converting the self-contained D-C power in the laser generator into a pulsating direct current for enabling the voltage of the D-C source to be stepped up by a transformer so that the discharge flashlamp can be energized to a high-intensity light radiation.

A still further object of the invention is the provision of a light-gathering optical means which concentrates the radiation from the flashlamp to a high-intensity light and transmits it to the laser-generating element for inciting it to laser generation.

Another object of the invention is to provide a means for intensifying the laser radiation by concentrating it to a pencil beam prior to emergence of the laser radiation from the portable generator.

Figure 1:
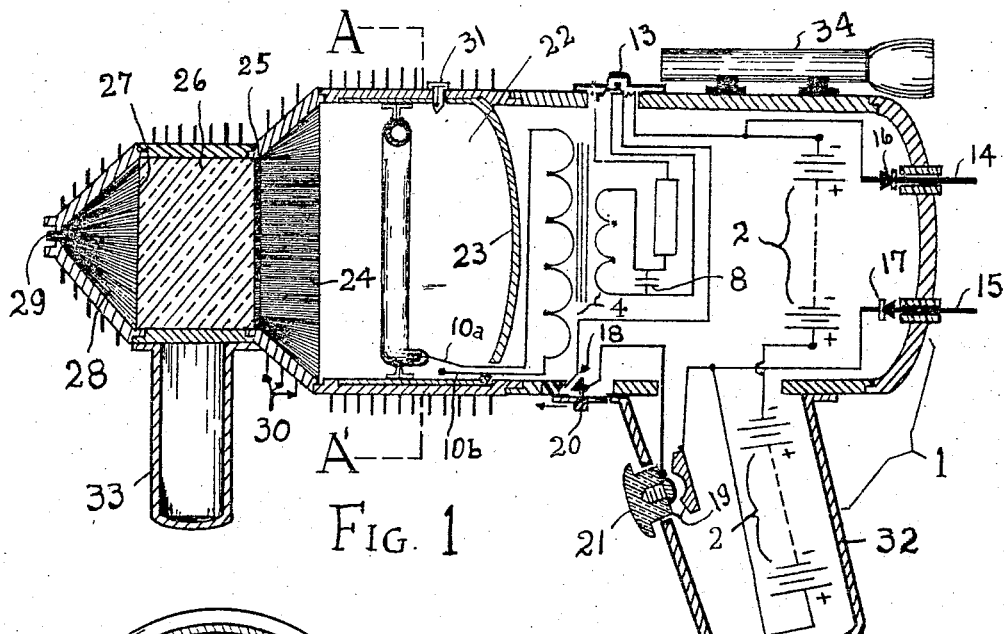

Other objects and advantages of my invention will be best understood from a consideration of the following specification taken in conjunction with the accompanying drawing forming part thereof, in which:

FIGURE 1 is a detail sectional view of the portable laser generator, showing constituent parts contained therein.

Figure 2:
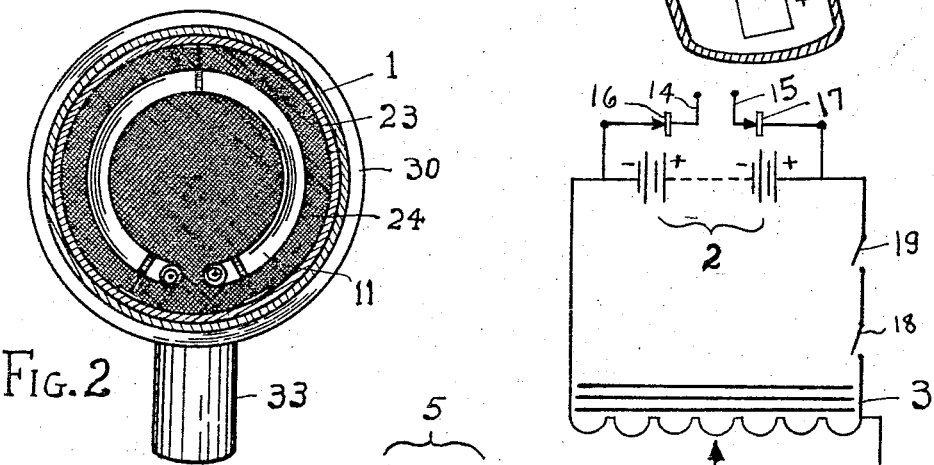
Figure 3:
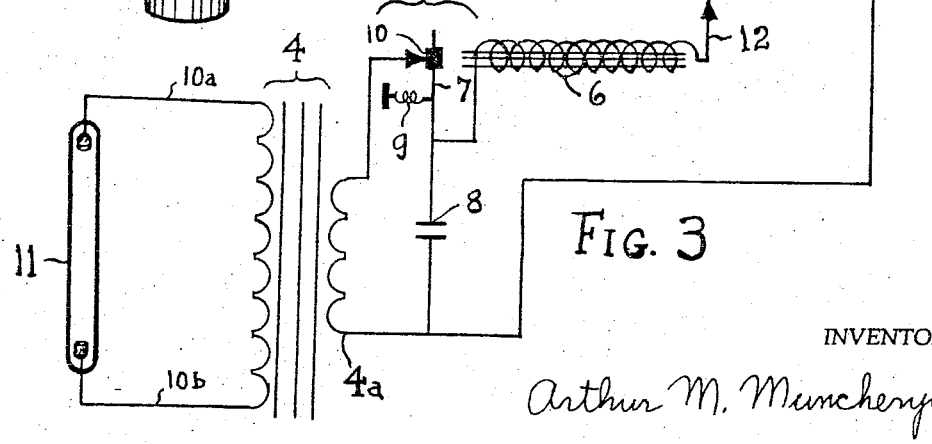

FIGURE 2 is a cross-sectional view of the portable laser generator taken at A–A′, and FIGURE 3 is a schematic diagram illustrating the arrangement of the rechargeable electric battery, a variable potentiometer connected across the battery, a vibrator to convert the D-C power from the battery to a unidirectional pulsating current, a step-up transformer for amplifying the voltage from the vibrator, and a flashlamp which receives the high-voltage pulsating current from the transformer and activates the laser element to laser radiation.

Referring to the drawing, the invention consists of a multiple-piece housing 1, made of any suitable material such as aluminum, stainless steel, or the like. The housing 1 contains a D-C power supply of rechargeable battery 2, across which a potentiometer 3 is connected to furnish a variable voltage from battery 2 to a step-up transformer 4 through a vibrator 5, which converts the D-C voltage from the battery 2 into a unidirectional pulsating voltage. The vibrator consists of a relay 6, a vibrating armature 7, and a spark-quenching capacitor 8. A spring 9 maintains the vibrating armature contact 10 in closed position with relation to the voltage from potentiometer 3. The pulsating unidirectional voltage from transformer 4 is applied through leads 10a and 10b across the flashlamp 11, which contains xenon and mercury vapor and radiates with a brilliant flash with each pulsation from the transformer 4. Since the frequency of pulsations is high, 15 to 40 pulses per second, the light emitted from flashlamp 11 appears continuous.

The frequency of the pulsations can be varied by moving the slide contact 12 of potentiometer 3; increasing the voltage of the potentiometer output (by clockwise turning the knob 13 to which the slide contact 12 is attached) will increase the number of pulsations per second, and decreasing this voltage, by rotating the knob counterclockwise, will decrease the pulsation rate. The contact prongs 14 and 15 from the battery 2 are used to connect the battery to a 110-volt alternating-current source for charging the battery when necessary; the current from the A-C source to battery 2 is made unidirectional by means of the rectifiers 16 and 17. An insulating cap (not shown in the drawing) may be placed over prongs 14 and 15 to protect the user from a possible electric shock during use of the laser generator.

The current from the power supply battery 2 to the flashlamp 11 can be traced as follows: To incite the flashlamp 11 to radiation, the laser safety switch 18 and the trigger switch 19 must be closed manually. This is accomplished by first pushing the knob 20 forward; this knob could be located on the forward grip 33, when desired. Then, the trigger switch button 21 is squeezed to close the trigger switch 19. The last operation energizes the potentiometer 3, whose output is fed through the primary winding 4a of transformer 4, the armature contact 10 of the vibrating armature 7, the relay coil 6, and back to the potentiometer winding through slide contact 12.

When the flashlamp 11 is energized, its high-intensity light radiates in all directions in chamber 22; the radiation strikes the mirror 23 which, in turn, reflects and converges the light in a forward direction. The reflected light from the mirror 23 together with the direct light from the flashlamp 11 become incident on a conical bundle of fiber optics 24, which is also known commercially as "light pipe" because of its property of transmitting light through its many fine filaments of glass of high refractivity. Because of the conical configuration of the fiber optics bundle 24, the light becomes concentrated at the cone apex 25, which area also represents the junction between the fiber optics bundle 25 and a laser-generating element 26, forming a finite space therebetween which acts as a reflector of laser radiation. The laser-generating element, or simply laser element 26, may be made of a cylindrical ruby rod, neodymium doped glass rod, or any other suitable laser-emitting material. The forward surface 27 of laser element 26 is thinly coated with a light-reflecting material, such as silver or a dielectric reflecting material.

The reflective coating of surface 27 is necessary because in laser generation the emitted radiation must oscillate axially in the laser rod in order to become amplified. The amplification is achieved by the cumulative collision of photons in the rod and their production of additional photons from it. Therefore, the emitted laser radiation oscillates by reflecting from the thinly coated surface 27 to junction 25 and back. This latter process continues until the radiation intensity of laser reaches a maximum threshold level, whereupon the laser beam bursts out through surface 27, passes through a second conical fiber optics bundle 28, and out to space from the cylindrical apex 29, integral therewith. In passing through the conical fiber optics bundle 28, the laser beam converges and thereby its radiant density $I_d$ increases in accordance with the equation $I_d = \pi(D/2)^2 \div \pi(d/2)^2 = D^2/d^2$, where D is the diameter of the base of the cone, and $d$ is the diameter of the apex of the cone. For instance, if the diameter of the base of fiber optics bundle 28 is 20 times the diameter of its apex 29, the laser beam emerging from the apex 29 will have an intensity 400 times greater than that produced by the laser element 26.

As the chamber 22 warms up, the heat due to flashlamp 11 therein is gradually conducted through the fiber optics bundle 24 to the laser element 26, whose normal operating temperature is between 70° and 85° F. when the latter temperature range is exceeded, the efficiency of laser emission decreases. To prevent excessive heating of the laser element 26, the surface of the housing 1 around the heat-affected zone is provided with fins 30, which radiate the heat to the atmosphere and thus maintain a relatively low temperature, or normal laser emission temperature. A thermometer 31 is also provided in the wall of chamber 22 to monitor the temperature therein; this thermometer, when properly calibrated, may indicate the relative temperature of the laser element 26.

In operation, the laser generator is held by two hands, one holding the trigger grip 32 and the other the forward grip 33. The switch 18 is closed by pushing the knob 20 forward with the index finger of the hand holding the trigger grip 32. The generator then is aimed at the desired target by means of the telescope 34, and then the trigger button 21 is squeezed. The generator immediately starts to fire with a pulsating burst of laser radiation. To stop the laser action, the trigger 21 is released and the knob 20 is pulled backwards; this operation opens both of the switches 18 and 19. Any remaining charge on the condenser 8 becomes immediately discharged in the vibrator circuit. If the battery charge is weakened subsequent to laser operation, the laser generator can be plugged into a 110-volt A-C power outlet and charged within several hours.

Although a preferred embodiment of my invention is shown and described, the invention is susceptible to further modification in the detail of construction without departing from the spirit and scope thereof.

I claim:

1. A directed-beam portable laser system, comprising a housing of pistol configuration having a forward and a rear section, each section having a forward and a rear compartment respectively formed therein, and separated by a reflective partition therebetween; said forward section tapering conically to a cylindrical projection integral therewith and having an aperture therein, and the rear compartment having therein a rechargeable power supply; a forward and a rear hand grip integrally formed respectively on said forward and rear sections, for supporting said housing in an aiming position, with said rear hand grip containing a portion of said power supply; the compartment in said forward section having therein a laser-beam generator means with a conical light pipe attached thereto positioned anteriorly to said partition having its reflective surface facing said light pipe; said laser-beam generator means being provided anteriorly thereto with a conical light pipe whose base portion being in contact with said generator means and its apex having a cylindrical portion passing through the aperture of said cylindrical projection of said forward section; said power supply being provided with a low- and a high-voltage section with said high-voltage section connected to said laser-beam generator means; series-connected dual switching means in the low-voltage circuit of said power supply and positioned in contiguous relation to said rear hand grip, whereby upon consecutive closing of said dual switching means said power supply transmits power through said high-voltage section to said laser-beam generator means to activate said means to emit radiation, which passes through said conical lite pipe and is amplified thereby by converging to a narrow parallel beam defined by the diameter of said cylindrical portion at the apex of said conical light pipe prior to emergence therefrom.

2. In a directed-beam portable laser system having a pistol-configured housing with an aperture at its forward end, a rechargeable power supply with a controlled vibrator connected in the circuit thereof and receiving direct current from said power supply to convert it into a unidirectional pulsating current, means in said housing and connected to the output of said vibrator for stepping up the voltage of said output, a laser generator means in the forward section of said housing and receiving voltage from said means for stepping up said voltage for activation of said laser generator means to emission of radiation, and an optical light conductor disposed adjacent to said laser generator means to receive laser radiation therefrom and to converge said radiation into a circular area anteriorly integral therewith prior to emergence of said radiation beam through the aperture of said housing, and a temperature indicator having its temperature sensing portion projecting into said housing through the wall thereof and the indicator portion thereof being attached to said wall and projecting to the exterior of said housing to monitor the temperature therein.

3. In a directed-beam portable laser system as defined in claim 1, wherein said laser-beam generator means comprises an electric discharge tube and a laser rod with conical light conductors positioned at the opposite ends thereof; one of said conical light conductors having a frustum in contact with said laser rod and a base located adjacent said discharge tube and receiving light therefrom for converging said light on said laser rod for activation thereof; the second of said light pipes having its base contiguous with said laser rod and its apex terminating in a circular projection and receiving laser radiation from said laser rod for amplifying said radiation by converging it through the conical portion thereof to said circular projection, which converts said laser radiation into a parallel beam prior to emergence thereof to the exterior of said system.

4. A directed-beam portable laser system as defined in claim 1, wherein said housing having corrugations externally thereof for cooling the contents of said housing by conduction of heat therefrom into the atmosphere surrounding said housing.

5. A directed-beam portable laser system, comprising a pistol-configured housing having therein a rear and a front compartment with an anteriorly disposed aperture therein, said compartments being separated one from the other by a partition with a reflective surface facing anteriorly thereof, a gaseous discharge tube positioned adjacent to the reflective surface of said partition and a laser rod with a conical fiber optics bundle at each end thereof to form a continuously tapering cone being disposed axially within said compartment and anteriorly to said discharge tube, with the base of said cone facing said discharge tube to receive therefrom illumination and to converge it through the conical section thereof onto the end of said laser rod for activation thereof; the second of said conical fiber optics bundle, having its base in contact with the front end of said laser rod and its apex being formed into a short cylinder to be accommodated in the aperture of said front compartment, to convert the converging laser beam received through the conical bundle thereof into a parallel beam during emergence therethrough; a rechargeable power supply disposed in said rear compartment and having a current rectifying means with an outlet means located at the posterior wall of said compartment and adapted to receive alternating current from an external source; a variable-frequency vibrator connected in the circuit of said power supply to convert the current thereof into a pulsating unidirectional current for amplification thereof by means of a transformer located in said compartment and connected to the output of said vibrator; the voltage output of said transformer being connected to said gaseous discharge tube to energize said tube to emission of light radiation.

6. A directed-beam portable laser system, comprising a housing having a forward and a rear section, forming a pistol configuration; each of said sections being provided with a compartment respectively disposed therein and separated one from the other by a reflective partition; the forward section of said housing tapering to an integrally formed cylindrical projection with an aperture disposed therein and the rear section having a hand grip; a second hand grip secured to said housing in the forward relation of said rear hand grip to jointly stabilize said laser system in an aiming position aided by an ocular secured to the upper part of said housing; the compartment in said forward section being cylindrical and having therein a laser rod positioned in an axial relation to said compartment in the anterior aspect of said partition whose reflective surface being disposed oppositely to said laser rod, an electric discharge tube positioned anteriorly to said partition, and a conical fiber optics bundle disposed at each end of said laser rod; one of said conical fiber optics bundles being in intermediate relation between said laser rod and said partition and having a frustum which being in contact with said laser rod, and the second of said conical fiber optics bundles having its base portion contiguous with the anterior end of said laser rod and its apex being provided with a cylindrical extension protruding through the aperture of the cylindrical projection of said tapered forward section; the compartment in said rear section having therein a rechargeable power supply extending into said rear hand grip and connected therein to a variable-frequency power vibrator means coupled therein to the primary of an adjacently positioned step-up transformer whose secondary being connected across said discharge tube for activation thereof; dual switching members connected in the circuit of said power supply to turn on and off the current to said vibrator; one of said switching members being located in the wall of said housing externally thereto and the other switching member being secured externally to said rear hand grip, whereby upon simultaneous closing of said switching members, said vibrator receives current from said power supply, converts said current into a unidirectional pulsating current and applies it to said transformer to be amplified thereby and applied to said discharge tube for emission of visible light therefrom, which light passing through said fiber optics bundle with frustum into said laser rod activates said rod to emission of laser radiation which, in turn, converges by passing through said conical fiber optics bundle with a cylindrical extension thereon to be intensified by said fiber optics bundle prior to emergence through said cylindrical extension thereof.

7. In a directed-beam laser system, an article of manufacture comprising a conical housing having a diverging base section, a sharply converging apex section with an aperture therein, and a cylindrical middle section between said base and apex sections; a chamber of corresponding section configurations formed therein; a laser rod having parallel end surfaces secured within said middle cylindrical section of said housing; one of said surfaces having a fiber optics cone with a frustrum in contact with the end surface of said rod, the base of said cone being in register with the base periphery of said diverging base section and collecting light externally thereof to illuminate said laser rod for activation thereof to emit radiation; the second of said end surfaces of said laser rod being provided with a sharply converging fiber optics cone with the base thereof in contact with said laser rod and its apex terminating in a short cylindrical projection protruding through the aperture of the apex section of said housing, said last cone receiving radiation from said laser rod to amplify the intensity thereof by converging said radiation to said short cylindrical projection whereby said radiation is converted into a parallel beam prior to emergence therethrough; the combination of said housing and said laser rod therein with its appended fiber optics cones at each end thereof forming a unitary device for generating a directed-beam laser radiation.

References Cited

UNITED STATES PATENTS 3,304,403  2/1967  Harper _____ 331—94.5

OTHER REFERENCES

Current Topics (Portable Solid State Laser), Franklin Institute Journal, vol. 273 (March 1962), pp. 262 and 263.

J. De Ment: Directed Energy Weapons, Electronics Industries (August 1962), pp. 92–96.

JEWELL H. PEDERSEN, *Primary Examiner.*

W. L. SIKES, *Assistant Examiner.*